US005546744A

United States Patent [19]
Winfree et al.

[11] Patent Number: 5,546,744
[45] Date of Patent: Aug. 20, 1996

[54] PULSE DETONATION APPARATUS WITH SPHERICAL SEALS

[75] Inventors: Don D. Winfree, Keller; Louis G. Hunter, Jr., Fort Worth, both of Tex.

[73] Assignee: Lockheed Martin, Fort Worth, Tex.

[21] Appl. No.: 410,334

[22] Filed: Mar. 24, 1995

Related U.S. Application Data

[63] Continuation-in-part of Ser. No. 265,661, Jun. 24, 1994, Pat. No. 5,473,885.

[51] Int. Cl.⁶ .................. F02C 5/02; F02K 7/06
[52] U.S. Cl. ......................... 60/247; 60/39.78
[58] Field of Search ............... 60/39.34, 39.38, 60/39.39, 39.40, 39.76, 39.78, 39.81, 201, 247, 248; 431/1

[56] References Cited

U.S. PATENT DOCUMENTS

| | | | |
|---|---|---|---|
| 2,557,198 | 6/1951 | Nichols | 60/39.39 |
| 2,930,196 | 3/1960 | Hertzberg et al. | 60/39.76 |
| 3,634,778 | 1/1972 | Melikian et al. | |
| 3,812,783 | 5/1974 | Yang et al. | |
| 4,645,448 | 2/1987 | Otto et al. | 60/39.76 |
| 4,741,154 | 5/1988 | Eidelman | |
| 4,870,903 | 10/1989 | Carel et al. | |
| 4,976,232 | 12/1990 | Coates | |
| 4,989,558 | 2/1991 | Coates | |
| 4,989,576 | 2/1991 | Coates | |
| 5,109,814 | 5/1992 | Coates | |
| 5,280,705 | 1/1994 | Epstein et al. | 60/247 |
| 5,345,758 | 9/1994 | Bussing | 60/39.76 |

*Primary Examiner*—Louis J. Casaregola
*Attorney, Agent, or Firm*—James E. Bradley

[57] ABSTRACT

A pulse detonation apparatus utilizes an inner housing which rotates relative to an outer housing. The inner housing has spherical inner seal surfaces that rotate with it. The outer housing has mating spherical seal surfaces that rotationally receive the inner seal surfaces. Ports extend through the inner seal surface and the outer seal surface. These ports register at least once per revolution. An inlet supplies a fuel mixture to the interior of the inner housing and each time the inner and outer housing ports align, the fuel mixture is transmitted into an annular detonation chamber where an igniter ignites the mixture to create a detonation wave. Circular seals surround the outer housing port to provide sealing against the high pressure, high temperature detonations. Purge air is admitted into the detonation chamber, a new fuel mixture is delivered to the detonation chamber, and the cycle is repeated.

20 Claims, 3 Drawing Sheets

PULSE DETONATION APPARATUS WITH SPHERICAL SEALS

CROSS REFERENCE TO RELATED APPLICATION

This invention is a continuation-in-part of application Ser. No. 08/265,661, filed Jun. 24, 1994, Pulse Detonation Engine (now U.S. Pat. No. 5,473,885).

BACKGROUND OF THE INVENTION

1. Field of the Invention

This invention relates in general to propulsion systems, and in particular to pulse detonation engines such as for aircraft, missiles and rockets.

2. Description of the Prior Art

A pulse detonation engine is an apparatus which produces a high pressure exhaust from a series of repetitive detonations within a detonation chamber. The process is a constant volume heat addition process. A gaseous fuel is detonated within a chamber, causing a pulse detonation wave which propagates at supersonic speeds. The detonation wave compresses the fluid within the chamber, increasing its pressure, density and temperature. As the detonation wave passes out the open rearward end, thrust is created. The cycle is then repeated.

At high speeds, such as Mach 2 to about Mach 3.5, such an engine would be theoretically more efficient than conventional turbojets because the engine does not require compressors or turbines. A pulse detonation engine supplying the same amount or more of thrust as a conventional gas turbine engine would theoretically weigh less. Also, a pulse detonation engine could be used as a propulsion system for a rocket.

Another prior art engine, known as a pulse jet engine, was employed in World War II. That engine relied on slow moving deflagration, not detonation. The deflagration waves are subsonic, not supersonic waves. A pulse jet engine is not a pulse detonation engine.

Although theoretically desirable, to applicant's knowledge there are no pulse detonation engines being used as propulsion devices at this time. The reason may be the problems resulting from very high detonation chamber temperatures, approximately 3,500° F. Also, initiating repetitive detonations is a problem. The detonation chamber must have an inlet port for supplying fuel, and the inlet port must close just before the detonation occurs. Very high pressures occur during the detonation. The valves must be capable of sealing against the high pressures under the high temperatures.

SUMMARY OF THE INVENTION

The pulse detonation apparatus of this invention employs tubular inner and outer housings which rotate relative to each other. The inner housing has a spherical inner seal surface on its exterior, and the outer housing has a mating spherical seal surface on its interior. At least one inner housing port extends through a portion of the inner housing to the inner seal surface. At least one outer housing port extends through a portion of the outer housing to the inner housing port. The ports will register with each other at least once per revolution as the inner and outer housing rotate relative to each other. An annular seal is located on one of the surfaces and surrounds the port for sealing.

One of the housings provides an injection chamber while the other housing provides a detonation chamber. Fuel flows into the injection chamber, and when the inner and outer housing ports are aligned with each other, the fuel flows into the detonation chamber. An igniter ignites the mixture which creates a detonation wave that begins rapidly moving toward the open end of the detonation chamber. The discharge of the detonation wave at high pressure creates thrust. Immediately after, a purge port opens to discharge a purge gas such as air, through the detonation chamber. The cycle is then repeated.

DETAILED DESCRIPTION OF THE INVENTION

Figure 1:
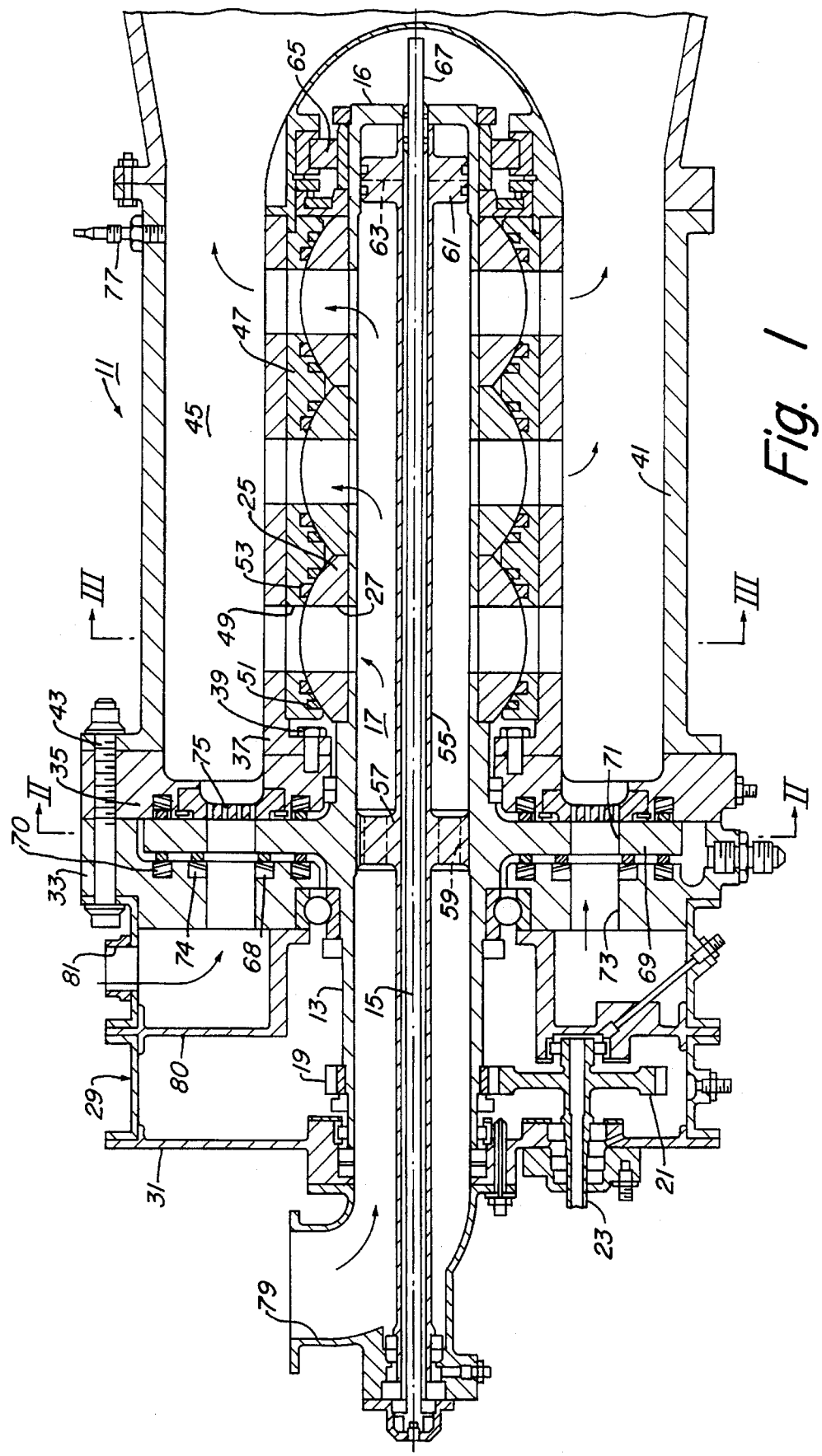
FIG. 1 is a sectional view of a pulse detonation apparatus constructed in accordance with this invention.

Referring to FIG. 1, pulse detonation apparatus 11 is shown configured for use as a rocket propulsion system although it may be configured for use with a jet aircraft or other system. Pulse detonation apparatus 11 has a tubular inner housing 13 which has a longitudinal axis 15. The bore of inner housing 13 serves as an injection chamber 17 in the embodiment shown. Inner housing 13 is open at its upstream end and closed at the rearward or downstream end 16. Inner housing 13 is rotatably driven by a drive means that includes a ring gear 19 mounted on inner housing 13. A drive gear 21 engages ring gear 19. Drive gear 21 is mounted to a shaft 23 which extends forward for connecting to a power source (not shown).

Figure 3:
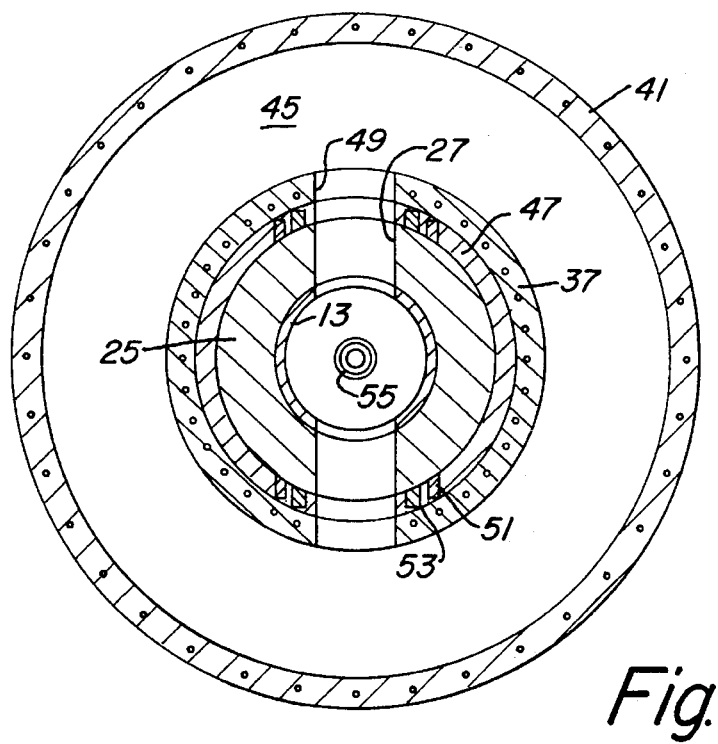
FIG. 3 is a sectional view of the pulse detonation apparatus of FIG. 1, taken along the line III—III of FIG. 1.

At least one spherical inner seal surface 25 (three shown) is mounted to inner housing 13 for rotation therewith. Each inner seal surface 25 is identical to the other, and each comprises a convex spherical element having a bore which receives inner housing 13. The upstream and downstream edges of the inner seal surfaces 25 are truncated and abut each other. At least one inner housing port 27 extends from injection chamber 17 radially through inner housing 13 and through inner seal surface 25, terminating at the convex surface. In the preferred embodiment, two of the inner housing ports 27 are shown for each inner seal surface 25, with each being 180° apart from the other as shown in FIG. 3.

An outer housing 29 surrounds inner housing 13 and is stationary relative to the rotation of inner housing 13. Outer housing 29 includes a gear case 31 on the upstream end that encloses drive gear 21. A bulkhead 33 is located at the downstream end of gear case 31. An end wall 35 is located downstream of bulkhead 33. Bulkhead 33 and end wall 35 are perpendicular to longitudinal axis 15.

A sleeve 37 extends rearward or downstream from end wall 35. Sleeve 37 is tubular and closely receives inner housing 13. Bolts 39 secure sleeve 37 to the downstream side of end wall 35. A tubular jacket 41 extends downstream from end wall 35. Jacket 41 has a larger diameter than sleeve 37, providing an annulus which serves as a detonation chamber 45 in the embodiment shown. Bolts 43 secure the bulkhead 33, end wall 35 and jacket 41 together. In the embodiment shown, the downstream end of jacket 41 is a diverging conical nozzle.

Inner sleeve 37 has mounted within its bore a plurality of spherical outer seal surfaces 47. Each outer seal surface 47 is concave and rotatably receives one of the inner seal surfaces 25. Each outer seal surface 47 is stationarily mounted to the stationary sleeve 37. Each outer seal surface 47 has two outer housing ports 49, each of which extends from detonation chamber 45 through sleeve 37 and outer seal surface 47. Outer housing ports 49 are spaced 180° apart from each other and are perpendicular to longitudinal axis 15. Each inner housing port 27 will register with one of the outer housing ports 49 twice per revolution of inner housing 13. A pair of seals 51, 53 are mounted to the outer seal surface 47 and surround each outer housing port 49. Seals 51, 53 are circular with seal 53 being of a smaller diameter than seal 51.

Figure 2:
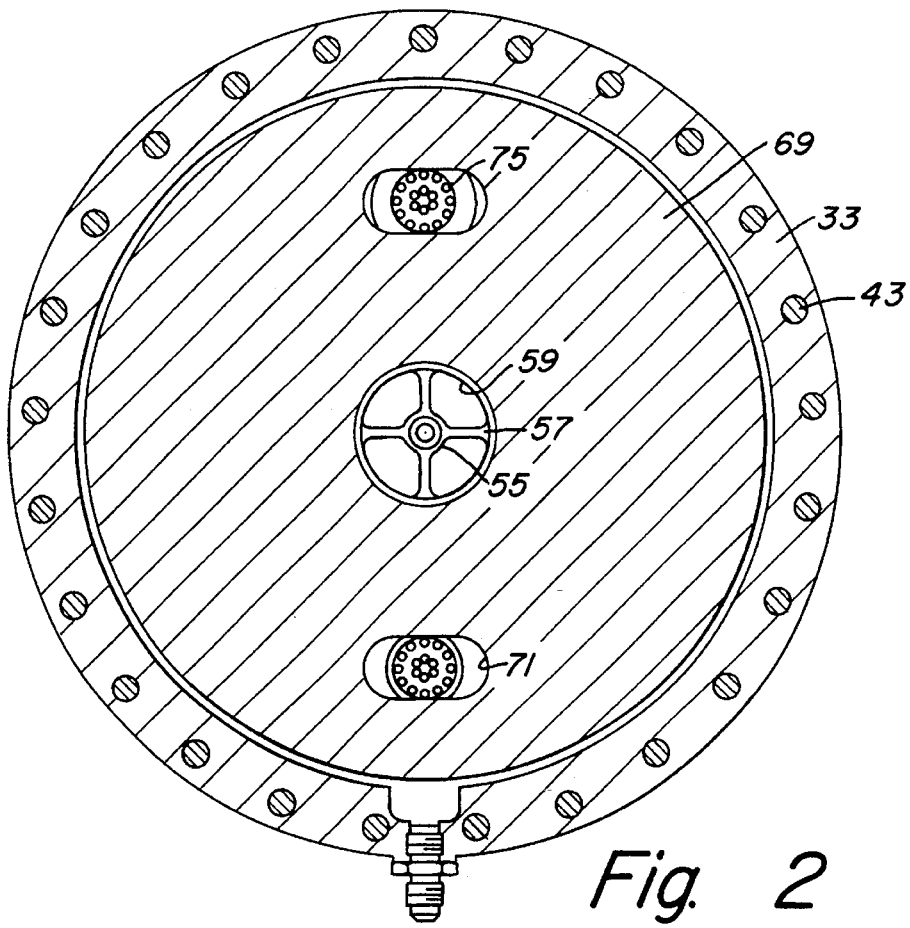
FIG. 2 is a sectional view of the pulse detonation apparatus of FIG. 1, taken along the line II—II of FIG. 1.

An outer tube 55 extends coaxially through inner housing 13 on longitudinal axis 15. Outer tube 55 has a mixer vane 57 mounted to it for rotation therewith. Mixer vane 57 has passages 59, shown in FIG. 2, for the passage of fuel flowing through it. A plug 61 is located at the downstream end and integrally formed with outer tube 55. Plug 61 serves as the downstream end of injection chamber 17. Lubricant passages 63 provide lubricant to bearings 65 which support the downstream end of inner housing 13 within sleeve 37.

An inner tube 67 extends concentrically within outer tube 55. Inner tube 67 extends farther downstream than outer tube 55 and serves as a return for lubricant pumped through the annular space between outer tube 55 and inner tube 67. Lubricant is also supplied to the gears 19, 21 and various other bearings by a number of passages which are not shown.

A purge valve plate 69 is integrally formed with inner housing 13 and extends radially outward therefrom perpendicular to longitudinal axis 15. Purge valve plate 69 is a flat plate that locates within a clearance formed between bulkhead 33 and end wall 35. Two purge plate ports 71, shown in FIG. 2, extend through purge valve plate 69. Two mating purge ports 73 are located in bulkhead 33 and register with purge plate ports 71 twice per revolution of purge valve plate 69. Mating purge ports 75 also are formed in the end wall 35, each preferably containing a flame arrester. Purge ports 75 comprise a plurality of small passages to reduce the impact of the detonation waves as they impact on end wall 35.

The purge plate ports 71 are timed to register with ports 73 and purge ports 75 twice per revolution after each detonation to provide purge air or gas to remove hot products and dilute trapped reactants. Such removal avoids premature ignition by providing a buffer zone of purge gas between the hot products and mixed reactants.

A pair opposed inner seals 68 are mounted to the bulkhead 33 and end wall 35 in the clearance between and sealingly engage the upstream and downstream sides of purge valve plate 69. A pair of larger diameter outer seals 70 are mounted to the bulkhead 33 and end wall 35 and also sealingly engage the upstream and downstream sides of purge valve plate 69. The inner seals 68 surround inner housing 13 and are located radially inward from purge ports 73 and purge ports 75. Outer seals 70 also surround inner housing 13 and are located radially outward from purge ports 73 and purge ports 75. Inner and outer seals 68, 70 are concentric with the longitudinal axis 15.

Two purge port seals 74 are mounted stationarily to bulkhead 33, each having a diameter slightly greater than the diameter of each purge port 73. Purge port seals 74 do not surround inner housing 13, rather each is concentric with the axis of one of the purge ports 73. Purge port seals 74 are spaced 180 degrees from each other. Lubricant is supplied to the seals from various passages (not shown).

One or more igniters 77 such as spark plugs are mounted to jacket 41 for detonating fuel within detonation chamber 45. A fuel inlet 79 is mounted to the open upstream end of inner housing 13 for supplying a mixture of fuel, such as stoichiometrically mixed reactants. A purge air inlet 81 extends into a separate plenum 80 within gear case 31 for delivering a purge fluid such as air to purge ports 73.

Figure 4:
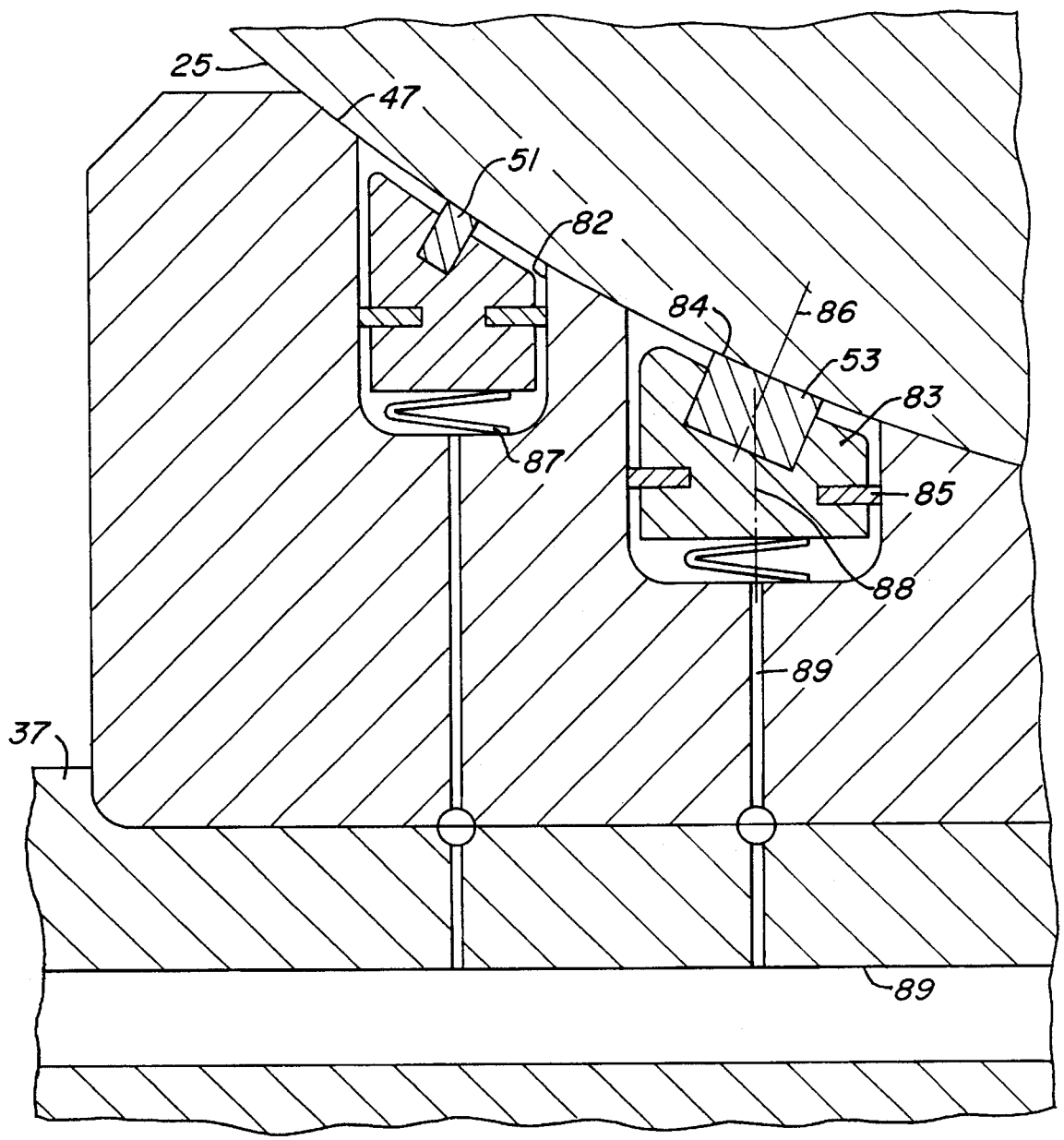
FIG. 4 is an enlarged sectional view of two of the seals employed with the pulse detonation apparatus of FIG. 1.

Referring to FIG. 4, in the preferred embodiment seals 51, 53 are each mounted to an annular carrier 83, which is movably carried within a groove 82. A pair of piston rings 85 provide sealing for carrier 83 within groove 82. A spring 87 within groove 82 urges each seal 51, 53 into sealing engagement with inner seal surface 25. Each seal 51, 53 has a seal face 84 that is concave in the shape of a segment of a sphere for mating with the spherical inner seal 25. Each seal 51, 53 is positioned so that a radial line 86 of inner seal 35 will be normal to each seal 53. In the embodiment shown, the axis 88 of each spring 87 is not on a radial line 86, rather intersects the radial line 86 at an acute angle. A component of the spring 87 force will force the seals 51, 53 against the spherical surface of inner seal 25.

Seal 53 will be subject to higher pressures and higher temperatures than seal 51, because seal 53 is closer to the inner housing ports 27 and outer housing ports 49. In the preferred embodiment, seal 53 has a larger thickness, resulting in more surface area per lineal increment in contact with inner seal 25 than seal 51. The smaller thickness or cross-sectional area of outer seal 51, however, enables it to provide sealing for higher pressures. Some leakage past seal 53 is expected, but seal 51 should completely seal against reactants from the detonation. Seal 53 is preferably of a higher temperature heat resistant material than seal 51. For example, seal 53 may be of ceramic while seal 51 may be of carbon. Lubricant passages 89 serve for supplying lubricant from the exterior of outer housing 29 to seals 51, 53.

Seals 68, 70, and 74, which seal against purge valve plate 69 (FIG. 1), are also spring-biased and of the same general construction and materials as seals 51, 53. Seals 68, 70, and 74 differ in that the seal face of each is normal to the direction of spring force and flat, unlike the concave seal faces 84 of seals 51, 53.

In operation, an exterior power source will rotate shaft 23 to cause gear 21 to rotate inner housing 13 while outer housing 29 remains stationary. A fuel mixture such as stoichiometrically mixed reactants of fuel and oxidizer flows in inlet 79, and is further mixed as it flows through mixer vane passages 59. Twice per revolution, inner housing ports 27 will align with outer housing ports 49, admitting a mixture of fuel to detonation chamber 45. Once inner housing ports 27 rotate slightly past outer housing ports 49, igniter 77 will actuate detonation of the fuel in detonation chamber 45. This detonation creates a high temperature, high pressure, detonation wave which discharges out the jacket 41, creating thrust. A reverberating expansion wave is created by the initial detonation wave. The expansion wave reflects off the end wall 35 and discharges from the rearward end of jacket 41, creating additional thrust.

Immediately after but prior to inner housing ports 27 aligning again with outer housing ports 49, purge plate ports 71 will align with ports 73 and purge ports 75. At the time of the detonation, purge plate ports 71 were out of registry with purge ports 75. Inner and outer seals 68, 70 and purge port seals 74 provide a closed upstream end to detonation chamber 45, preventing any products of the detonation from flowing into plenum 80 and gear case 31. Once ports 71, 73 and purge ports 75 are aligned, air supplied through air inlet 81 will flow through plenum 80, through purge plate ports 71, 73 and purge ports 75 into detonation chamber 45. Inner and outer seals 68, 70 and purge port seals 74 prevent the flow of purge air into gear case 31. The purge air removes hot products and dilutes trapped reactants from detonation chamber 45. Immediately thereafter, inner housing ports 27 will align again with outer housing ports 49 and the process will be repeated. The rotational speed of inner housing 13 is selected to create pulses at a rate of approximately 100 cycles per second.

The invention has significant advantages. The spherical seals provides effective sealing for the high temperature high pressure detonations. The sealing avoids any leakage of high pressure reactants back into the injection chamber.

While the invention has been shown in only one of its forms, it should be apparent to those skilled in the art that it is not so limited but is susceptible to various changes without departing from the scope of the invention.

We claim:

1. A pulse detonation apparatus, comprising in combination:
   a tubular inner housing which has a longitudinal axis;
   a tubular outer housing coaxially surrounding the inner housing, the outer housing having a sleeve which receives the inner housing and having a jacket which is spaced outward from the sleeve, providing an annulus;
   drive means for rotating the inner housing and the sleeve relative to each other;
   a spherical inner seal surface coaxially located on the inner housing;
   a mating spherical outer seal surface coaxially and stationarily located on the sleeve for rotatably receiving the inner seal surface;
   an inner housing port extending through the inner housing to the inner seal surface;
   an outer housing port extending through the sleeve to the outer seal surface which cyclically registers with the inner housing port to provide an injection passage between the inner housing and annulus which opens and closes as the inner housing and sleeve rotate relative to each other;
   at least one annular seal located on one of the seal surfaces surrounding one of the ports for sealing the injection passage;
   each of the housings having an upstream end and a downstream end, with the downstream end of one of the housings being closed, defining an injection chamber, and the downstream end of the other of the housings being open, defining a detonation chamber;
   injection means for injecting a gaseous fuel into the injection chamber for flowing through the injection passage into the detonation chamber; and
   detonation means in the detonation chamber for detonating the gaseous fuel received in the detonation chamber when the injection passage is closed to create a detonation wave for passing out the open downstream end of the detonation chamber.

2. The apparatus according to claim 1, wherein the inner housing port is substantially normal to the inner seal surface.

3. The apparatus according to claim 1, wherein there are two of the seals concentrically surrounding said one of the ports, one of the seals being of smaller diameter and of more temperature resistant material than the other.

4. The apparatus according to claim 1, wherein the injection chamber is located within the inner housing and the detonation chamber is located within the annulus of the outer housing.

5. The apparatus according to claim 1, further comprising purge means for flowing a purge gas through the detonation chamber and out the open downstream end after the detonation occurs and before the next injection of gaseous fuel is received in the detonation chamber.

6. The apparatus according to claim 1, further comprising:
   a rotatably driven purge valve at the upstream end of the detonation chamber for flowing a purge gas through the detonation chamber and out the open downstream end after the detonation occurs and before the next injection of gaseous fuel is received in the detonation chamber.

7. The apparatus according to claim 1, wherein the seal is mounted within a groove formed in the outer seal surface and is biased by a spring toward the inner seal surface.

8. The apparatus according to claim 1, wherein:
   the seal is mounted within a groove formed in the outer seal surface; and wherein the apparatus further comprises:
   lubricant passage means extending to the groove for delivering a lubricant to the seal.

9. A pulse detonation apparatus, comprising in combination:
   a tubular inner housing which has a longitudinal axis, an upstream end and a downstream end which is closed, defining an injection chamber;
   a tubular outer housing coaxially surrounding the inner housing, having a sleeve which rotatably receives the inner housing and having a jacket spaced outward from the sleeve, providing an annulus having an upstream end wall and a downstream end which is open, defining an annular detonation chamber;
   drive means for rotating the inner housing relative to the outer housing;
   at least one spherical inner seal surface coaxially located on the inner housing for rotation therewith;
   a mating spherical outer seal surface coaxially and stationarily located on the sleeve for rotatably receiving the inner seal surface;
   at least one inner housing port extending through a portion of the inner housing to the inner seal surface;
   at least one outer housing port extending through a portion of the sleeve to the outer seal surface, the outer housing port cyclically registering with the inner housing port as the inner seal surface rotates, to provide an injection passage between the injection chamber and detonation chamber which opens and closes;
   at least one circular seal located on one of the seal surfaces encircling one of the ports for sealing the injection passage;
   an injection inlet in the injection chamber for injecting a gaseous fuel into the injection chamber for flowing through the injection passage when open into the detonation chamber; and
   an igniter in the detonation chamber for detonating the gaseous fuel received in the detonation chamber when the injection passage is closed to cause a detonation wave which passes out the open downstream end of the detonation chamber.

10. The apparatus according to claim 9, wherein:

the seal is mounted within a groove formed in the outer seal surface and biased by a spring toward the inner seal surface; and wherein the apparatus further comprises:

lubricant passage means extending through a portion of the sleeve to the groove for delivering a lubricant to the seal.

11. The apparatus according to claim 9, wherein there are two of the seals concentrically surrounding said one of the ports, one of the seals having a smaller diameter, a smaller seal contact area per lineal increment, and being of a more temperature resistant material than the other.

12. The apparatus according to claim 9, further comprising purge means for flowing a purge gas through the detonation chamber and out the open downstream end after the detonation occurs and before the next injection of gaseous fuel is received in the detonation chamber.

13. The apparatus according to claim 9, further comprising:

a purge port stationarily located at the upstream end wall of the detonation chamber; and a purge valve at the upstream end wall of the detonation chamber for rotation in unison with the inner housing for cyclically registering with the purge port for flowing a purge gas through the detonation chamber and out the open downstream end after the detonation occurs and before the next injection of gaseous fuel is received in the detonation chamber.

14. The apparatus according to claim 9, further comprising:

a purge port stationarily located at the upstream end wall of the detonation chamber; and a circular purge valve plate located at the upstream end wall of the detonation chamber and mounted to the inner housing for rotation in unison with the inner housing, the purge valve plate having a plate port which cyclically registers with the purge port for flowing a purge gas through the detonation chamber and out the open downstream end after the detonation occurs and before the next injection of gaseous fuel is received in the detonation chamber.

15. The apparatus according to claim 9, wherein there are two of the inner housing ports and two of the outer housing ports.

16. A pulse detonation apparatus, comprising in combination:

a tubular inner housing which has a longitudinal axis, an upstream end with an injection inlet and a downstream end which is closed, defining an injection chamber;

a tubular outer housing coaxially surrounding the inner housing, having a sleeve which rotatably receives the inner housing and a jacket spaced outward from the sleeve to provide an annulus between the sleeve and the jacket, the annulus having an upstream end wall and a downstream end which is open, defining a detonation chamber;

drive means for rotating the inner housing relative to the outer housing;

an inner housing port extending transverse to the longitudinal axis through a portion of the inner housing;

an outer housing port extending transverse to the longitudinal axis through a portion of the sleeve, the outer housing port cyclically registering with the inner housing port as the inner housing rotates, to provide an injection passage between the injection chamber and detonation chamber which opens and closes as the inner housing rotates;

an injection inlet at the upstream end of the injection chamber for injecting a gaseous fuel mixture into the injection chamber for flowing through the injection passage when open into the detonation chamber;

an igniter in the detonation chamber for detonating the gaseous fuel mixture received in the detonation chamber when the injection passage is closed to cause a detonation wave which passes out the open downstream end of the detonation chamber;

a purge port stationarily located in the upstream end wall of the detonation chamber;

a purge valve plate mounted rigidly to the inner housing at the upstream end wall of the detonation chamber for rotation in unison with the inner housing, the purge valve plate having a plate port which cyclically registers with the purge port for flowing a purge gas through the detonation chamber and out the open downstream end after the detonation occurs and before the next injection of gaseous fuel is received in the detonation chamber;

a purge inlet in the outer housing for communicating the purge gas to the plate port and purge port;

a pair of purge plate seals mounted stationarily in the outer housing and extending concentrically around the inner housing, one of the purge plate seals in sealing engagement with the purge valve plate radially inward of the purge inlet, and the other of the purge plate seals in sealing engagement with the purge valve plate radially outward of the purge inlet; and a purge port seal mounted stationarily in the outer housing in sealing engagement with the purge valve plate, the purge port seal being coaxial with the purge port.

17. The apparatus according to claim 16, further comprising:

a bulkhead mounted stationarily in the outer housing upstream of the upstream end wall of the detonation chamber, the bulkhead and end wall defining a clearance between them for receiving the purge valve plate; and wherein the purge port seal is mounted to the bulkhead.

18. The apparatus according to claim 16, further comprising:

a bulkhead mounted in the outer housing upstream of the upstream end wall of the detonation chamber, the bulkhead and end wall defining a clearance between them for receiving the purge valve plate, the bulkhead having a bulkhead purge port which registers with the purge port in the end wall; and a flame arrester mounted to the purge port in the end wall.

19. The apparatus according to claim 16, further comprising:

a bulkhead mounted in the outer housing upstream of the upstream end wall of the detonation chamber, the bulkhead and end wall defining a clearance between them for receiving the purge valve plate, the bulkhead having a bulkhead purge port which registers with the purge port in the end wall;

a flame arrester mounted to the purge port in the end wall; and wherein the purge port seal is stationarily mounted to the bulkhead.

20. The apparatus according to claim 16, further comprising:

a bulkhead mounted in the outer housing upstream of the upstream end wall of the detonation chamber, the bulkhead and end wall defining a clearance between them for receiving the purge valve plate, the bulkhead having a bulkhead purge port which registers with the purge port in the end wall; wherein there are four of the purge plate seals, two mounted stationarily to the end wall in sealing engagement with a downstream side of the purge valve plate, and two of them mounted stationarily to the bulkhead in sealing engagement with an upstream side of the purge valve plate; and wherein the purge port seal is stationarily mounted to the bulkhead.

* * * * *